(12) United States Patent
Ding

(10) Patent No.: US 9,458,925 B1
(45) Date of Patent: Oct. 4, 2016

(54) VEHICLE SHIFT SYSTEM

(71) Applicant: Thunder Power Hong Kong Ltd., Central (HK)

(72) Inventor: Jia-Wei Ding, Taipei (TW)

(73) Assignee: THUNDER POWER HONG KONG LTD., Central (HK)

( * ) Notice: Subject to any disclaimer, the term of this patent is extended or adjusted under 35 U.S.C. 154(b) by 0 days.

(21) Appl. No.: 14/979,495

(22) Filed: Dec. 27, 2015

(51) Int. Cl.
*F16H 59/10* (2006.01)
*F16H 59/12* (2006.01)
*F16H 63/42* (2006.01)
*B60K 37/06* (2006.01)

(52) U.S. Cl.
CPC ............ *F16H 59/105* (2013.01); *B60K 37/06* (2013.01); *F16H 59/12* (2013.01); *F16H 63/42* (2013.01); *B60K 2350/1028* (2013.01); *F16H 2063/423* (2013.01)

(58) Field of Classification Search
None
See application file for complete search history.

(56) References Cited

U.S. PATENT DOCUMENTS

| | | | | |
|---|---|---|---|---|
| 6,295,887 | B1 * | 10/2001 | DeJonge | F16H 59/08 477/99 |
| 8,413,784 | B2 * | 4/2013 | Giefer | B60T 7/085 192/219.4 |
| 9,021,912 | B2 * | 5/2015 | Hermansson | F16H 61/24 74/473.3 |
| 9,145,141 | B1 * | 9/2015 | Kim | B60W 30/18181 |
| 2004/0259685 | A1 * | 12/2004 | Inoue | F16H 59/105 477/118 |
| 2009/0320633 | A1 * | 12/2009 | Knysch | F16H 59/0204 74/473.3 |
| 2011/0036194 | A1 * | 2/2011 | Ishihara | F16H 59/0204 74/473.31 |
| 2011/0040462 | A1 * | 2/2011 | Jerger | F16H 59/105 701/60 |
| 2013/0110365 | A1 * | 5/2013 | Kimura | F16H 61/12 701/65 |
| 2013/0269463 | A1 * | 10/2013 | Lindner | F16H 59/105 74/473.3 |
| 2014/0345412 | A1 * | 11/2014 | Wang | F16H 59/105 74/473.21 |
| 2015/0025762 | A1 * | 1/2015 | Wang | F16H 63/40 701/64 |
| 2015/0059510 | A1 * | 3/2015 | Knisely | F16H 61/0213 74/473.12 |
| 2015/0101439 | A1 * | 4/2015 | Lee | F16H 59/105 74/473.33 |
| 2015/0314727 | A1 * | 11/2015 | Marunaka | B60K 6/22 340/441 |

* cited by examiner

*Primary Examiner* — Jacob S Scott
(74) *Attorney, Agent, or Firm* — Kilpatrick Townsend & Stockton LLP

(57) ABSTRACT

A vehicle shift system, including a shift pedal, a sensor configured to generate a first signal when the shift pedal moves in a first direction, and a controller coupled to the sensor and configured to control a transmission to change from a first transmission setting to a second transmission setting in response to the first signal.

13 Claims, 3 Drawing Sheets

VEHICLE SHIFT SYSTEM

FIELD OF THE INVENTION

The disclosure generally relates to a vehicle shift system.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Transmissions enable vehicles such as cars and trucks to transfer power from the engine to the wheels. Some transmission types may include automatic transmissions, manual transmissions, continuously variable transmissions, etc. In operation, transmissions enable a driver to increase speed, decrease speed, change direction, and park.

SUMMARY OF THE INVENTION

The present disclosure is directed to a vehicle shift system that includes a shift pedal, and a sensor configured to generate a first signal when the shift pedal moves in a first direction. A controller couples to the sensor and is configured to control a transmission to change from a first transmission setting to a second transmission setting in response to the first signal.

An aspect of the disclosure includes, a method of changing transmission settings in a vehicle with a vehicle shift system. The method includes receiving a first signal from a sensor, wherein the sensor emits the first signal in response to movement of the shift pedal in a first direction. The method then controls a transmission to change between a first transmission setting and a second transmission setting in response to the first signal.

Another aspect of the disclosure includes a vehicle with a transmission and a vehicle shift system. The vehicle shift system includes a shift pedal and a sensor configured to generate a first signal when the shift pedal moves in a first direction. A controller couples to the sensor and to the transmission, enabling the controller to control the transmission to change between a first transmission setting and a second transmission setting in response to the first signal. The vehicle may also include a display configured to show whether the transmission is in the first transmission setting or the second transmission setting.

BRIEF DESCRIPTION OF THE DRAWINGS

Various features, aspects, and advantages of the present invention will be better understood when the following detailed description is read with reference to the accompanying figures in which like characters represent like parts throughout the figures, wherein.

DETAILED DESCRIPTION

One or more specific embodiments of the present invention will be described below. These embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The embodiments discussed below include a vehicle shift system with a shift pedal and/or button. In operation, the vehicle shift system enables a user to quickly and easily change a transmission setting (e.g., drive, reverse, park, first gear, second gear, etc.) of a transmission. Furthermore, the vehicle shift system may also reduce the size of typical shift systems.

Figure 1:
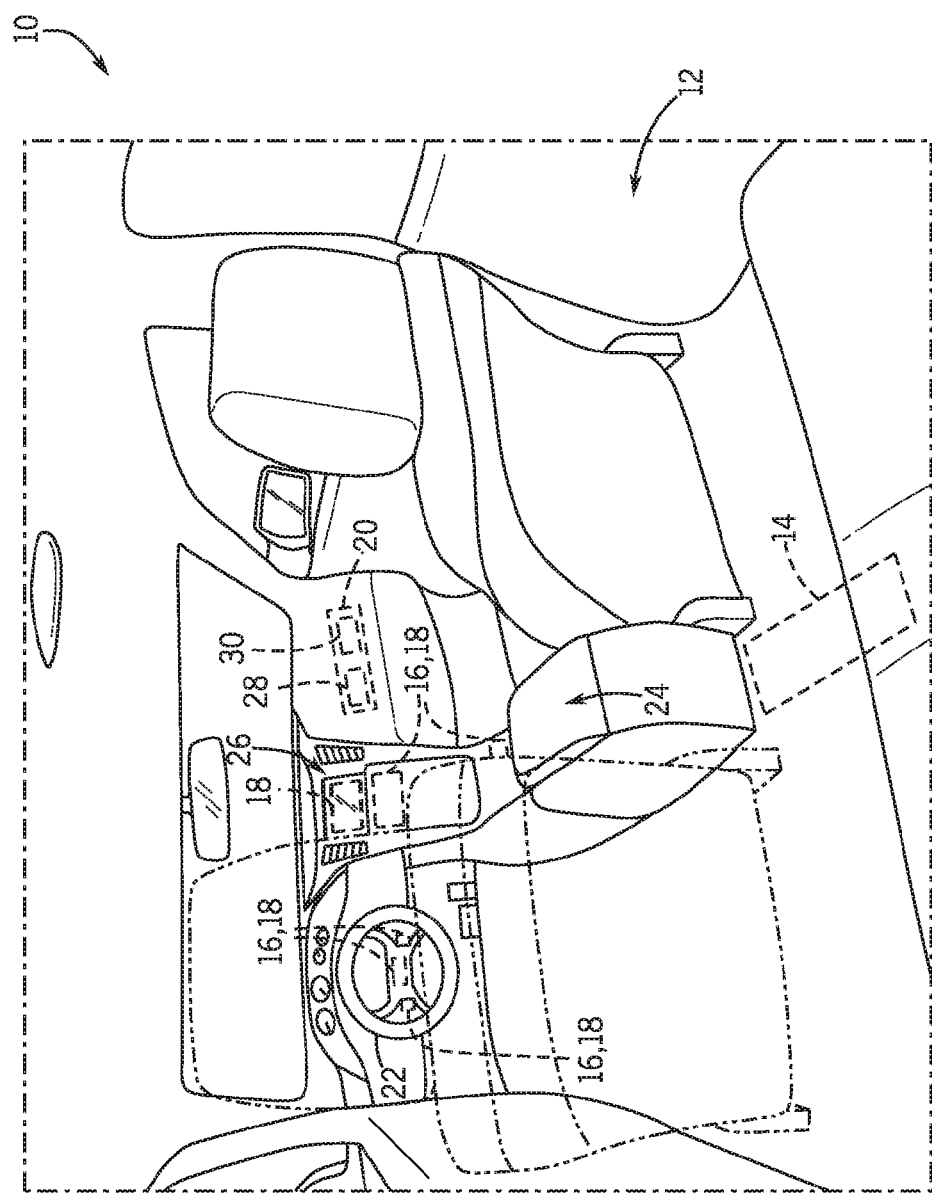
FIG. 1 is an interior view of an embodiment of a vehicle with a vehicle shift system.

FIG. 1 is an interior view of an embodiment of a vehicle 10 with a vehicle shift system 12. While an interior of a car or truck is illustrated, the vehicle 10 may be any kind of vehicle such as a train, truck, car, bus, motorcycle, moped, tractor, etc. The vehicle shift system 12 enables an operator to quickly and easily change a transmission setting (e.g., drive, reverse, park, first gear, second gear, etc.) of a transmission 14. The vehicle shift system 12 may include a shift pedal(s) 16 or button(s) 18 that electrically couple to a controller 20. The shift pedal(s) 16 or button(s) 18 may be positioned at one or more locations in the vehicle 10. For example, the shift pedal(s) 16 or button(s) 18 may be positioned on a steering wheel 22, console 24, display 26, etc.

In operation an operator pushes and/or pulls the shift pedal 16 sending a signal to the controller 20. As illustrated, the controller 20 includes one or more processors 28 and one or more memories 30. As the processor 28 receives the signal the processor 28 executes instructions stored in the memory 30 to control the transmission 14. In other words, the controller 20 controls the transmission setting of the transmission 14 in response to signals from the shift pedal 16. The transmission settings may include drive, reverse, park, first gear, second gear, etc.

As will be explained below, some embodiments of the vehicle shift system 12 may send more than one signal (e.g., 1, 2) to the controller 20 to control the order in which the controller 20 changes the transmission settings. For example, the transmission settings may be in a particular order (e.g., reverse, park, drive, first gear, second gear). The signal from the shift pedal 16 may therefore indicate in which order the controller 20 should change the transmission settings.

In some embodiments, the controller 20 may determine whether a change in the transmission setting is appropriate. For example, if the vehicle 10 is driving on a highway and the controller 20 receives a signal to change the transmission setting to park or reverse, the controller 20 may determine that changing to one or more transmission settings is inappropriate. If the signal is inappropriate, based on current operating conditions, the controller 20 ignores the signal.

Figure 2:
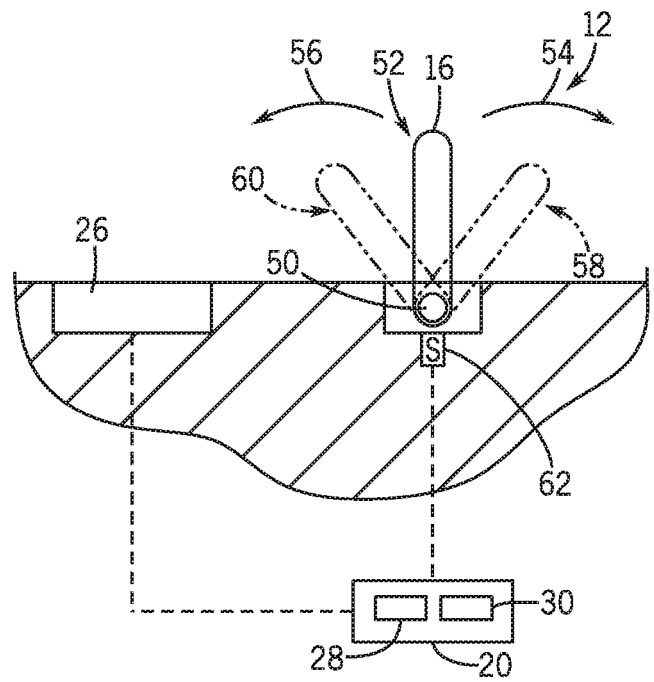
FIG. 2 is a side view of an embodiment of a vehicle shift system.

FIG. 2 is a side view of an embodiment of a vehicle shift system 12 with a shift pedal 16. In operation, the shift pedal 16 enables a user to change a transmission setting of the transmission 14 quickly and easily. As illustrated, the shift pedal 16 couples to the vehicle 10 and may rotate about a shaft 50 from a rest position 52. For example, the shift pedal 16 may rotate in either circumferential direction 54 or circumferential direction 56 to respective first position 58 and second position 60. In some embodiments, a spring or other resilient device may bias the shift pedal 16 to the rest position 52 after the user engages the shift pedal 16.

When the shift pedal 16 rotates, a sensor 62 may sense the movement and in response sends a signal to the controller 20. The processor 28 receives the signal and then executes instructions stored in the memory 30 to change a transmission setting of the transmission 14 (seen in FIG. 1). For example, the controller 20 may control the transmission 14 to change from drive to park, park to reverse, drive to first gear, first gear to second gear, or any other combination thereof. In order to help a user determine a current transmission setting, the controller 20 may also change a display 26 so that the display 26 reflects the current transmission setting. In some embodiments, the vehicle shift system 12 may provide audio and/or tactile feedback in addition to visual feedback through the display 26. For example, the display 26 may include speakers that emit a noise or message (e.g., voice that says the current transmission setting) that indicates a change in the transmission setting. In some embodiments, there may be a click that can be felt and/or heard when the shift pedal 16 reaches the first position 58 or the second position 60.

In some embodiments, the direction of movement of the shift pedal 16 may be sensed by the sensor 62 (e.g., directions 54, 56). The controller 20 may then use the direction of movement of the shift pedal 16 to determine the order in which to change the transmission setting. For example, if the transmission 14 is in park and the transmission settings were organized in the following order reverse, park, drive, first gear, and second gear, then movement of the shift pedal in direction 54 may change the vehicle 10 from park to drive. Likewise, if the shift pedal 16 were moved in direction 56 then the vehicle 10 would change from park to reverse. In some embodiments, the opposite may occur with the movement of the shift pedal 16 in direction 56 changing the transmission from park to drive and movement of the shift pedal 16 in direction 54 changing the transmission setting from park to reverse. In some embodiments, the movement of the shift pedal 16 in either direction 54 or 56 may not change the order within which the controller 20 changes through the transmission settings. For example, if the order of the transmission settings were reverse, park, drive, first gear, second gear, etc. then movement by the shift pedal 16 in either direction 54 or 56 would not change the order through which the transmission 14 shifts. It should be understood that the order, type, and number of the transmission settings is only exemplary and that other orders, types, and numbers of transmission settings are possible.

Figure 3:
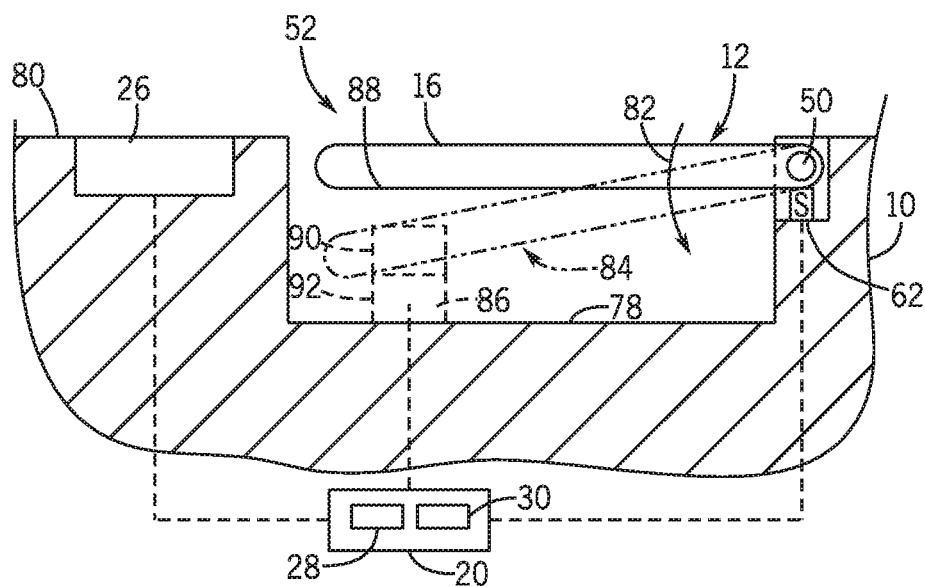
FIG. 3 is a side view of an embodiment of a vehicle shift system.

FIG. 3 is a side view of an embodiment of a vehicle shift system 12. As illustrated, the vehicle shift system 12 includes a shift pedal 16 that rests within and/or next to a cavity 78 in a surface 80 of the vehicle 10. The cavity 78 may enable the shift pedal 16 to be level or nearly level with the surface 80 while still enabling rotation in direction 82. In operation, the shift pedal 16 rotates from an at rest position 52 to a transmission change position 84. As explained above, some embodiments may include a spring or other resilient device may bias the shift pedal 16 to the rest position 52 after the user engages the shift pedal 16.

As the shift pedal 16 rotates a sensor 62 senses the movement and sends a signal to the controller 20. The processor 28 then executes instructions stored in the memory 30 to change a transmission setting of the transmission 14 (seen in FIG. 1). For example, the controller 20 may control the transmission 14 to change from drive to park, park to reverse, drive to first gear, first gear to second gear, or any other combination thereof. In order to help a user determine a current transmission setting, the controller 20 may also change a display 26 so that the display 26 reflects the current transmission setting. In some embodiments, the vehicle shift system 12 may provide audio and/or tactile feedback in addition to visual feedback through the display 26. For example, the display 26 may include speakers that emit a noise or message (e.g., voice that says the current transmission setting) that indicates a change in the transmission setting. In some embodiments, there may be a click that can be felt and/or heard when the shift pedal 16 reaches the transmission change position 84.

In some embodiments, the vehicle shift system 12 may include a button 86 that acts as a sensor; provides audio and tactile feedback; and/or provides resilient bias of the shift pedal 16 to the rest position 52. For example, as a user presses the shift pedal 16, the pedal rotates in direction 82 about the shaft 50. A bottom surface 88 of the shift pedal 16 then contacts the button 86 depressing the button 86. As the button transitions from a rest position 90 to a depressed position 92 the button 86 transfer a signal to the controller 20 which uses the signal to change the transmission setting. The button 86 may also emit an audio and/or tactile click when the button reaches the depressed position 92 signaling to the user that the shift pedal was sufficiently moved to signal a change in a transmission setting.

Figure 4:
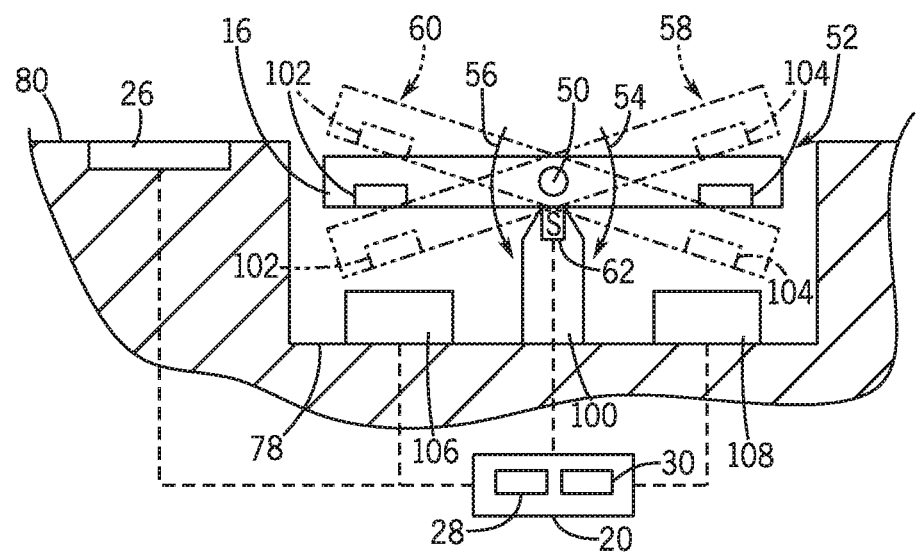
FIG. 4 is a side view of an embodiment of a vehicle shift system.

FIG. 4 is a side view of an embodiment of a vehicle shift system 12. As illustrated, the vehicle shift system 12 includes a shift pedal 16 that rests within and/or next to a cavity 78 in a surface 80 of a vehicle 10. The cavity 78 may enable the shift pedal 16 to be level or nearly level with the surface 80 while still enabling rotation in directions 54 and 56 about a shaft 50 suspended from a post or shaft 100. From the rest position 52, the user may rotate the shift pedal 16 in either circumferential direction 54 or circumferential direction 56 to respective first position 58 and second position 60, depending on which direction the user moves the shift pedal 16. In some embodiments, a spring or other resilient device may bias the shift pedal 16 to the rest position 52 after the user engages the shift pedal 16.

When the shift pedal 16 rotates, a sensor 62 may sense rotation of the shift pedal 16 and send a signal to the controller 20. In some embodiments, the sensor 62 may couple to the shaft 50 to sense rotation. In some embodiments, the shift pedal 16 may include magnets 102 and 104 that interact with respective sensors 106 and 108 to detect rotation of the shift pedal 16. For example, as the shift pedal 16 rotates in direction 54 the magnet 104 will interact with the sensor 108 triggering a signal from the sensor 108 to the controller 20. Likewise, if the shift pedal 16 rotates in direction 56 the magnet 102 interacts with the sensor 106 triggering a signal from the sensor 106 to the controller 20. As the processor 28 receives signals from the sensors 62, 106, and/or 108, the processor 28 executes instructions stored in the memory 30 to change a transmission setting of the transmission 14 (seen in FIG. 1). For example, the controller 20 may control the transmission 14 to change from drive to park, park to reverse, drive to first gear, first gear to second gear, or any other combination thereof. In order to help a user determine a current transmission setting, the controller 20 may also change a display 26 so that the display 26 reflects the current transmission setting. In some embodiments, the vehicle shift system 12 may provide audio and/or tactile feedback in addition to visual feedback through the display 26. For example, the display 26 may include speakers that emit a noise or message (e.g., voice that says the current transmission setting) that indicates a change in the transmission setting. In some embodiments, there may be a click that can be felt and/or heard when the shift pedal 16 reaches the first position 58 or the second position 60. In some embodiments, the sensors 106, 108 may be buttons that operate similar to that described with respect to button 86 in FIG. 3.

In operation, the direction of movement of the shift pedal 16 may be sensed by the sensors 62, 106, and/or 108 (e.g., directions 54, 56). The controller 20 may then use the direction of rotation of the shift pedal 16 to determine the order within which to change the transmission setting. For example, if the transmission 14 is in park and the transmission settings were organized in the following order reverse, park, drive, first gear, and second gear, then movement of the shift pedal in direction 54 may change the vehicle 10 from park to drive. Likewise, if the shift pedal 16 were moved in direction 56 then the vehicle 10 would change from park to reverse. In some embodiments, the opposite may occur with the movement of the shift pedal 16 in direction 56 changing the transmission from park to drive and movement of the shift pedal 16 in direction 54 changing the transmission setting from park to reverse. In some embodiments, the movement of the shift pedal 16 in either direction 54 or 56 may not change the order within which the controller 20 changes through the transmission settings. Furthermore, it should be understood that the order, type, and number of transmission settings is only exemplary and that other orders, types, and numbers of transmission settings are possible.

Figure 5:
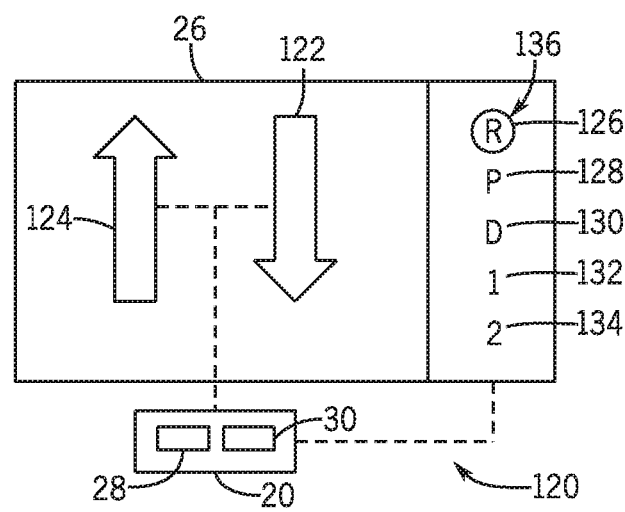
FIG. 5 is a front view of a touchscreen display with buttons that change a transmission setting.

FIG. 5 is a front view of a touchscreen display 26 with one or more buttons 120 that change a transmission setting. In some embodiments, the vehicle shift system 12 may include a touchscreen display 26 and/or a shift pedal 16 (seen in FIGS. 1-4) that enable a user to change transmission settings of the transmission 14. As illustrated, the touchscreen display 26 may include buttons 120 in the form of arrows 122 and 124 that enable a user to change the shifting order. While arrows are used other symbols are possible. In some embodiments, there may only be a single symbol that acts as the button for changing the transmission setting. In another embodiment, each of the transmission settings may have a button (e.g., 126, 128, 130, 132, 134). This layout enables a user to immediately select the desired transmission setting instead of the user shifting through the transmission settings until the desired setting is reached. When selected, the vehicle shift system 12 may provide a visual cue or signal 136 such as a circle that surrounds the transmission setting. In some embodiments, the vehicle shift system 12 may provide audio and/or tactile feedback in addition to visual feedback through the display 26. For example, the display 26 may include speakers that emit a noise or message (e.g., voice that says the current transmission setting) that indicates a change in the transmission setting. In some embodiments, the touchscreen display may emit a vibration that can be felt by the user.

Once the button 120 is pushed, the touchscreen display sends a signal to the controller 20. The processor 28 then executes instructions stored in the memory 30 to change a transmission setting of the transmission 14 (seen in FIG. 1). For example, the controller 20 may control the transmission 14 to change from drive to park, park to reverse, drive to first gear, first gear to second gear, or any other combination thereof. As explained above, the controller 20 may also determine whether a change in the transmission setting is appropriate. For example, if the vehicle 10 is driving on a highway and the controller 20 receives a signal to change the transmission setting to park or reverse, the controller 20 may determine that changing to one or more transmission settings is inappropriate. If the signal is inappropriate, based on current operating conditions, the controller 20 ignores the signal.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A vehicle shift system, comprising:
a portion of a vehicle interior defining a cavity;
a shaft within the cavity;
a shift pedal comprising a first end and a second end that freely rotate, the shift pedal couples to the shaft between the first and second ends, the shift pedal changes position by rotating about the shaft from a rest position to a first shift position and a second shift position, wherein the shift pedal is substantially level with a surface surrounding the cavity in the rest position, wherein the first end couples to a first magnet;
a biasing element coupled to the shift pedal that biases the shift pedal from the first and second shift positions to the rest position;
a sensor within the cavity and configured to interact with the first magnet and generate a first signal when the shift pedal changes to the first shift position and to generate a second signal when the shift pedal changes to the second shift position; and
a controller coupled to the sensor and configured to control a transmission to change from a first transmission setting to a second transmission setting in response to the first signal and from the second transmission setting to the first transmission setting in response to the second signal.

2. The system of claim 1, comprising a second magnet coupled to the second end of the pedal, wherein the second magnet is configured to interact with a second sensor within the cavity.

3. The system of claim 1, comprising a display configured to show whether the transmission is in the first transmission setting or the second transmission setting.

4. The system of claim 1, wherein a steering wheel defines the cavity that receives the shift pedal.

5. The system of claim 1, wherein a center console defines the cavity that receives the shift pedal.

6. The system of claim 1, comprising an audio system that emits an audio signal in response to a change in the transmission setting.

7. A method of changing transmission settings in a vehicle with a vehicle shift system, comprising:
   receiving a first signal from a first sensor, wherein the first sensor emits the first signal in response to interaction with a first magnet coupled to first end of the shift pedal as the first end rotates to a first shift position, wherein the shift pedal and a shaft couple together and rest within a cavity defined by an interior of the vehicle with the shift pedal being substantially level with a surface surrounding the cavity;
   receiving a second signal from the second sensor, wherein the second sensor emits a second signal in response to interaction with a second magnet coupled to a second end of the shift pedal as the second end rotates to a second shift position; and
   controlling a transmission to change between a first transmission setting and a second transmission setting in response to the first signal, and to change from the second transmission setting to the first transmission setting in response to the second signal.

8. The method of claim 7, emitting an audio signal in response to a change in the transmission setting.

9. A vehicle, comprising:
   an interior surface that defines a cavity;
   a transmission; and
   a vehicle shift system, comprising:
      a shaft within the cavity;
      a shift pedal comprising a first end and a second end that freely rotate, the shaft couples to the shift pedal between the first and second ends, the shift pedal changes position by rotating about the shaft from a rest position to a first shift position and a second shift position, wherein the shift pedal is substantially level with a surface surrounding the cavity, wherein the first end couples to a magnet;
      a biasing element coupled to the shift pedal that biases the shift pedal from the first and second shift positions to the rest position;
      a sensor within the cavity configured to interact with the magnet and generate a first signal when the shift pedal changes to the first shift position and that generates a second signal when the shift pedal changes to the second shift position; and
      a controller coupled to the sensor and configured to control the transmission to change from a first transmission setting to a second transmission setting in response to the first signal and from the second transmission setting to the first transmission setting in response to the second signal.

10. The system of claim 9, comprising a display configured to show a transmission setting.

11. The system of claim 9, comprising an audio system that emits an audio signal in response to a change in the transmission setting.

12. The system of claim 10, wherein the display is a touchscreen.

13. The system of claim 12, wherein the touchscreen includes a button that enables a user to change between the first transmission setting and the second transmission.

* * * * *